J. W. HOLMLUND.
BED SPRING AND THE LIKE.
APPLICATION FILED MAY 11, 1917.

1,259,401. Patented Mar. 12, 1918.
3 SHEETS—SHEET 1.

Witness:
E. M. Schweiger

John W. Holmlund, Inventor.
By Emil Leuhart
Attorney.

J. W. HOLMLUND.
BED SPRING AND THE LIKE.
APPLICATION FILED MAY 11, 1917.

1,259,401.

Patented Mar. 12, 1918.
3 SHEETS—SHEET 2.

Witness:
E. M. Schweiger.

John W. Holmlund, Inventor.
By Emil Neukash
Attorney.

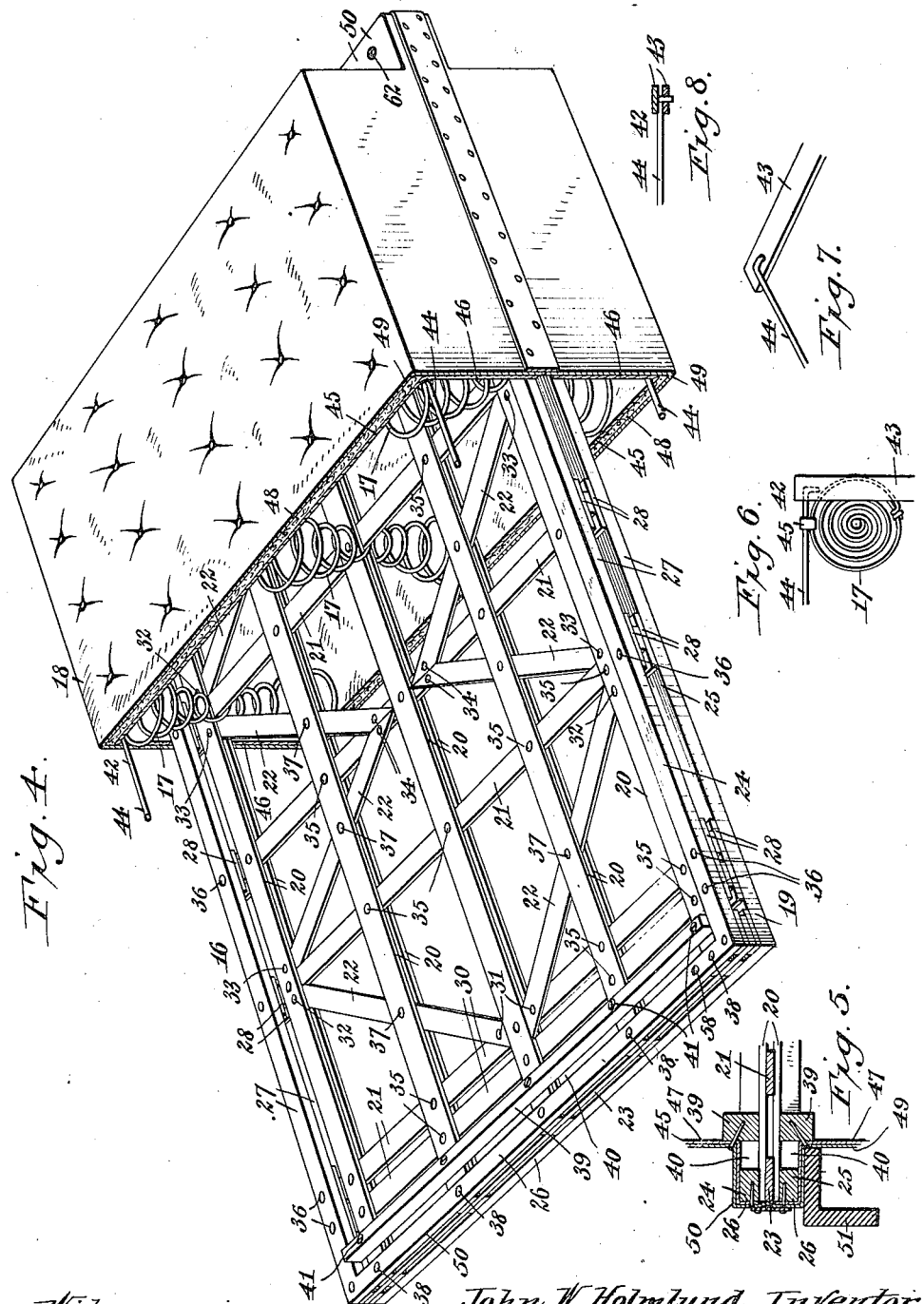

UNITED STATES PATENT OFFICE.

JOHN W. HOLMLUND, OF BUFFALO, NEW YORK.

BED-SPRING AND THE LIKE.

1,259,401.  Specification of Letters Patent.  Patented Mar. 12, 1918.

Application filed May 11, 1917. Serial No. 167,903.

*To all whom it may concern:*

Be it known that I, JOHN W. HOLMLUND, a citizen of the United States, residing at Buffalo, in the county of Erie and State of New York, have invented certain new and useful Improvements in Bed-Springs and the like, of which the following is a specification.

My invention relates to spring constructions for mattresses, bed springs, articles of furniture, and the like; but more particularly to bed springs.

The primary object of my invention is the construction of a light, durable and inexpensive spring construction.

It also has for its object the provision of a bed spring which is reversible and in which novel means are provided for securing or supporting the springs in a simple and efficient manner so that they will be retained in vertical positions and be yielding from opposite ends toward the center.

Further objects are the provision of an improved frame in which the springs are centrally secured; the whole being so constructed that the frame and the springs supported thereby may be incased within a covering of ticking or other suitable material which may be padded or unpadded; and in so constructing the bed spring that the covering or casing may be dispensed with entirely to the end that the springs are fully exposed.

It further has for its object the provision of a bed spring formed in sections and in which provision is made for detachably connecting the sections together; also the provision of a bed spring in which the usual diagonal ties may be used for connecting the ends of the springs or in which such diagonal ties may be dispensed with, as may be desired.

It further has for its object the provision of yielding tie-frames for securing the upper and lower ends of the outermost springs.

Further objects are to so construct the bed spring that portions thereof serve to prevent the side rails of a bed being moved out of right angular position with reference to the head and foot members of the bed. This therefore overcomes one objectionable feature in metallic bedsteads not overcome by the bed springs now in use.

With these and other objects in view, which will be clearly understood from the description to follow, the invention consists in the novel features of construction and in the arrangement and combination of parts to be hereinafter described and particularly pointed out in the subjoined claims.

In the drawings,—

Fig. 4 is a sectional perspective view of a bed-spring constructed in accordance with my invention.

Fig. 5 is an enlarged section taken on line $b$—$b$, Fig. 1; but showing the bed-spring resting upon a side rail of a bed.

Figs. 6 to 8 are detail views of portions of one of the yielding frames to which the ends of the outermost springs of the bed-spring are secured.

Reference being now had to the drawings in detail, like numerals refer to like parts throughout the several figures.

Figure 1:
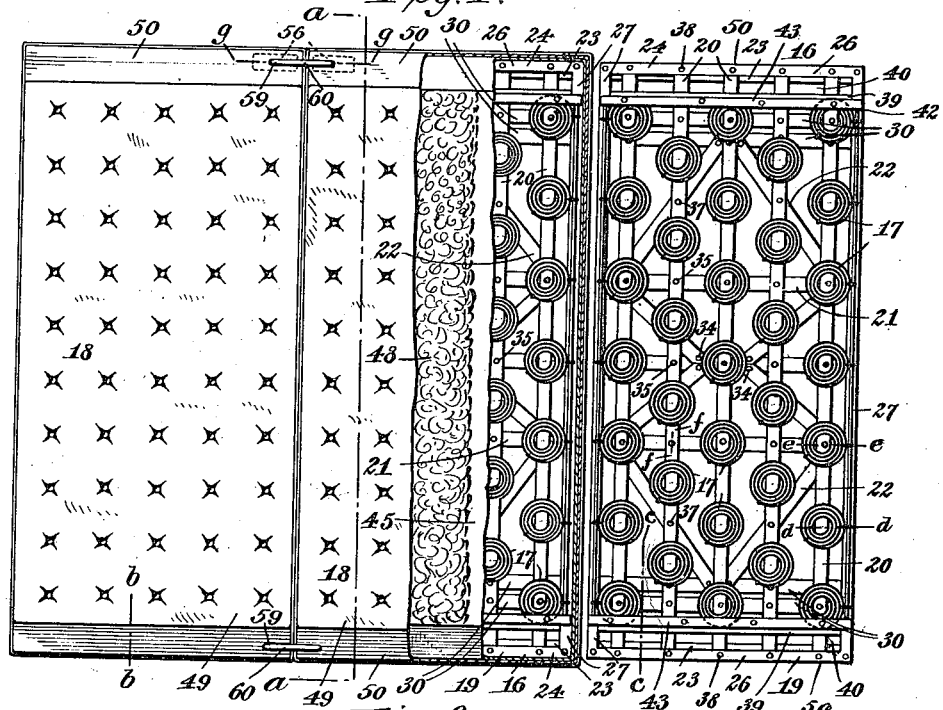
Figure 1 is a sectional plan view of a sectional bed-spring constructed according to my invention, one of the sections being shown without the use of the covering or casing of ticking employed in the remaining sections.
Figure 2:
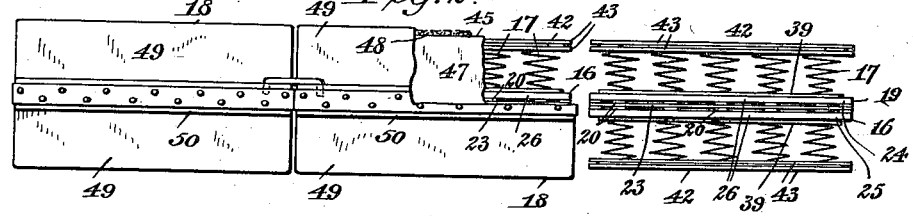
Fig. 2 is a side elevation of the sectional bed-spring shown in Fig. 1.

The reference numeral 16 designates the frame in its entirety; 17 the coil springs supported by said frame, and 18 the covering or casing which may be or need not be used, as desired. It is therefore to be understood that the construction herein illustrated and described is thoroughly practicable without the covering or casing, due to the particular manner in which the springs are centrally supported or fastened to the frame.

The frame is of exceedingly light weight due to its being constructed of wooden strips or slats and can therefore be easily handled. It comprises an outer rectangular frame member 19, transverse supporting strips or slats 20 arranged in pairs spaced apart, longitudinal tie-strips or slats 21 passing between the several pairs of supporting strips or slats 20, diagonal brace strips or slats 22 also passing between the pairs of supporting strips or slats intersected thereby, and end filler strips or slats 23.

Figure 14:
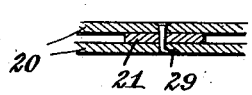
Fig. 14 is an enlarged section taken on line $f$—$f$, Fig. 1, showing the manner of securing the supporting strips or slats and the tie strips or slats of the frame together.

The rectangular frame member 19 is constructed in two parts 24, 25, which are spaced apart to receive the ends of the supporting and tie-strips 20 and 21, respectively, between them; the several pairs of transverse supporting strips 20 being separated at their ends by the end filler strips 23. At the sides of the frame member 19, said filler strips and the ends of the several pairs of supporting strips 20 are fastened between the side bars 26 of the two parts of said frame member; while at the ends of said frame member, the top and bottom bars 27 of each of the parts of the rectangular frame member are secured to the ends of the longitudinal tie-strips 21, said tie-strips 21 being separated from said end bars 27 by filler blocks or pieces 28 so that the spaces between the end bars at opposite ends of the frame member 19 correspond to the spaces between the side bars 26 thereof. In preferred form of my invention, the various wooden strips constituting the said frame are nailed together and have the pointed ends of the nails clenched, as shown at 29, Fig. 14, so as to securely fasten the various parts of the frame in a substantial manner.

In the drawings I have shown a bed-spring formed of three sections divided transversely so that it can be easily removed from a bed for cleaning the same or the floor beneath the bed. When making the bed-spring in three sections the sections are somewhat wider than long; but it is to be understood that the bed-spring may be formed in two parts, or may be otherwise divided; or, if desired, it may be formed in a single unit. In all cases, regardless of the number of units employed to form the entire bed-spring, the construction of the bed-spring or each of the units of the same will be the same as herein shown and described, with the exception that in some cases it may be advisable to arrange the supporting strips 20 lengthwise and the tie-strips 21 crosswise. This, however, would in no manner alter the construction.

In the preferred arrangement of strips disposed within the space bounded by the frame member 19, I arrange two of the tie-strips 21 in close proximity to each other near each side of the bed-spring, as shown at 30, said tie-strips being fastened flatwise side by side between the transverse supporting strips 20. There is therefore a pair of these tie-strips near each side of the bed-spring. One of the tie-strips 21 of the bed-spring is preferably arranged centrally between the sides of the bed-spring and a tie-strip is arranged between said center tie-strip and each pair of the tie-strips near opposite sides of said frame.

For convenience in describing the invention I shall term the tie-strips 21 between the central tie-strip and the two pairs of side tie-strips, the intermediate tie-strips.

The inner strip of each pair of side tie-strips, shown at 30, has the ends of one pair of the diagonal brace strips 22 secured thereto, as at 31, said brace strips extending from such points to the intermediate tie-strips, at which points they enter between the pairs of transverse supporting strips 20 nearest the end bars 27 of the rectangular frame member 19 and are nailed thereto, as at 32. From the center tie-strip 21, two pairs of the transverse brace strips 22 extend in opposite directions toward the ends of said intermediate tie-strips and at such points also have their ends entered between said pairs of supporting strips 20 and are fastened thereto, as at 33. Said last-mentioned diagonal brace strips are also nailed to the center tie-strip, as at 34.

The longitudinal tie-strips are all securely nailed to the transverse supporting strips, as at 35, and are also fastened between the end bars 27 of the rectangular frame member 19, as at 36. The diagonal brace strips 22 are securely nailed to the transverse supporting strips, as at 37, at the points where they are passed between said strips. The ends of said transverse supporting strips are fastened between the side bars 26 of the rectangular frame member 19, as at 38, the nails used for this purpose being of sufficient length to secure the filler strip 23 between the ends of the several pairs of transverse strips 20.

A retainer strip 39 extends lengthwise near each side of the frame, and these retainer strips are spaced from the side bars 26 of the frame member 19, as at 40. Said retainer strips are of greater height or depth than width and are set edgewise onto the transverse supporting strips so that they project above and beneath the upper and lower surfaces of the frame member. Suitable fastenings, such as screws 41 are passed through said retainer strips and enter the transverse supporting member or, if desired, may pass through said supporting members and enter the retainer strip on the opposite side of the frame.

The frame of the bed-spring therefore comprises two spaced rectangular parts and properly connected intermediate members arranged lengthwise and transversely and braced together in a secure manner. The springs are arranged in several transverse rows on the frame of each section, and in applying them in place they are fastened to the several pairs of transverse supporting strips 20 before said strips are fastened in place. In positioning and securing the springs in place, a pair of supporting strips are held apart the desired distance, and at regular intervals along their length the springs are slipped onto the strips with one of the convolutions, preferably the centermost convolution, slipped between the two strips and the adjacent convolutions on opposite sides thereof in contact with the outer faces of said strips.

When the strips with their attached springs are placed in position on the rectangular frame member 19 and nailed, the convolutions of the springs between the two strips are securely clamped so that there is no possibility of the springs freeing themselves, since the convolutions thereof curve around the edges of the strips at opposite sides thereof. The fastening of the longitudinal tie-strips 21 at intervals between the transverse supporting strips tends to hold the latter in proper spaced condition so as to firmly clamp the central convolutions of the springs between them. By thus fastening the springs to the transverse supporting strips they extend in opposite directions therefrom; that is, practically one-half of the spring projects upwardly and the other half downwardly from said strips. Owing to such arrangement of the springs, it is not found necessary to tie the outer or free ends of the same together but, if desired, they may be so tied. As the tying of the springs together is well known in the art, I have not considered it necessary to illustrate the same.

The outermost springs of the bed-spring are secured to a tie frame 42 which comprises two pairs of wooden strips or slats 43 arranged at opposite sides of the bed-spring or each section thereof, as the case may be, and having the upper convolutions of the outermost springs at the sides clamped therebetween. These two pairs of slats are connected together by comparatively stiff wires 44 to which the two end rows of springs of the bed-spring, or each section thereof, are secured, as at 45. One of these tie frames is therefore arranged above and the other below the frame member 19 of the bed-spring and, like said frame-member, is of rectangular formation with the two pairs of slats at the sides of the bed-spring or each section thereof, and the wires connecting said slats at the upper and lower ends of the bed-spring or each section thereof, as the case may be. This is particularly desirable, since when sitting upon the edge of the bed the slats 43 at such edge are depressed and the weight carried thereby is distributed over a considerable area of the spring due to the connection of said slats with the wires at opposite ends of the bed-spring or each section thereof. Moreover, by connecting the two pairs of slats with the wires, a flexible connection is provided between them, this being very desirable in a sectional bed for the reason that these wires are arranged transversely at intermediate points of the bed and should be able to flex with the downward movement of the springs.

Figure 3:
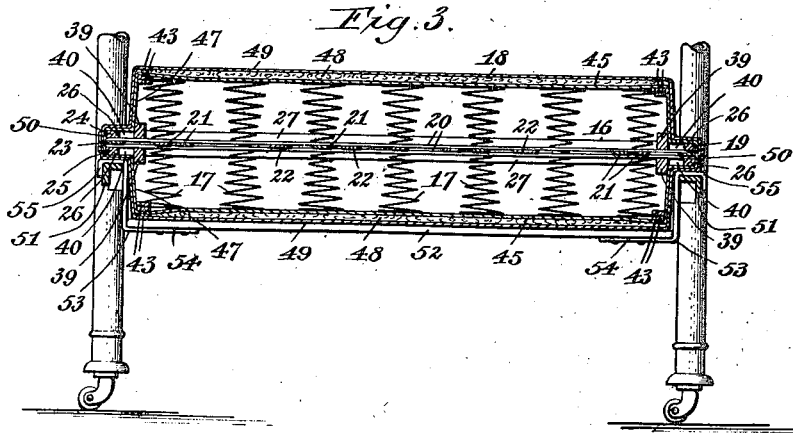
Fig. 3 is a transverse section taken on line $a$—$a$, Fig. 1; the section, however, being shown in connection with a bed, on the side rails of which the bed-spring is supported.
Figure 9:
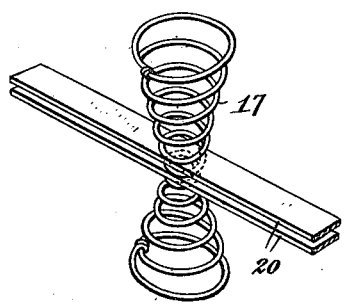
Fig. 9 is a perspective view of one of the springs and a pair of supporting strips or slats to which the spring is secured midway between its ends.

With the frame 16 constructed as described, the springs 17 applied thereto, and the tie frames 42 secured to the ends of the outermost springs, the bed-spring is completed for use; but, if desired, the same may be covered in the manner shown in Figs. 3 and 4, in which ticking 45 or other suitable material is stretched over the free ends of the springs to cover the top and bottom of the bed-spring, and this ticking is then directed upwardly from the bottom and downwardly from the top, as at 46, and fastened to the two parts 24, 25 of the frame member 19 at the upper and lower ends of said member. At the sides the material is directed downwardly from the top and upwardly from the bottom, as at 47, and is secured to the retainer strips 39 at opposite sides of the frame. The material is thence directed outwardly and around the edge of the two parts 24, 25 of the frame member 19, at which points it may be tacked or otherwise secured.

On the ticking thus stretched over the free ends of the springs, suitable padding 48 is applied, over which an outer casing or covering of ticking 49 or the like is fitted, the ends and sides of each bed-spring section being covered with said outer covering or casing and fastened to the frame in a manner similar to the ticking 45. When thus covering the bed-spring, or a section thereof, two ledges 50 are provided at opposite sides of the spring, or each section of the spring, as the case may be.

With the bed-spring thus completed it is placed within a bedstead with the two opposite ledges supported by the side rails 51 of the bedstead. The upper portions of the springs therefore provide the major portion of the resiliency owing to the fact that the springs are supported centrally between their ends, but owing to the several intermediate strips 20, 21 and 22 being constructed of comparatively thin pieces of wood, these strips have a tendency to yield slightly under weight, and for this reason I provide under each transverse row of springs, a bed slat 52 which is secured at opposite ends to metallic hangers 53. Said hangers are provided with inwardly-directed portions 54 at their lower ends to which the slats 52 are secured, and with hook-shaped portions 55 at their upper ends which are adapted to hook over the side rails 51 of the bedstead.

With the bed-spring thus constructed, the lower portions of the springs are properly supported and yield slightly when the superimposed weight is sufficient to cause the intermediate wooden strips to flex. By fastening the springs centrally between their ends to a supporting frame, the bed-spring is made reversible, and when used with either side up, the ledges 50 at the sides of the frame will properly support the spring, and in addition thereto any additional support required will be furnished by the slats 52 arranged in the planes of the springs and beneath each transverse row thereof.

Figure 10:
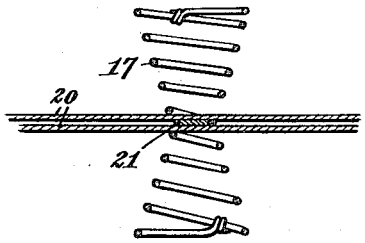
Fig. 10 is a vertical section through one of the springs, showing the manner in which the same is supported by its pair of supporting strips or slats at a point where one of the tie strips or slats intersects said supporting strips or slats.
Figure 11:
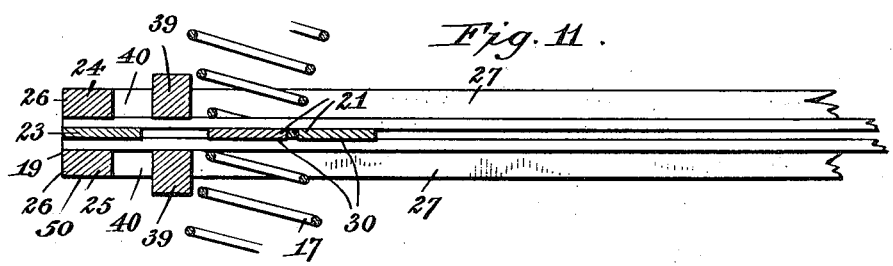
Fig. 11 is an enlarged transverse section taken on line $c$—$c$, Fig. 1, looking toward the left, the intermediate portion of the spring only being shown in sections.
Figure 12:
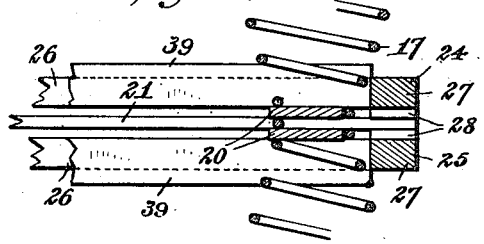
Fig. 12 is an enlarged longitudinal section taken on line $d$—$d$, Fig. 1; the intermediate portion of the spring only being shown.
Figure 13:
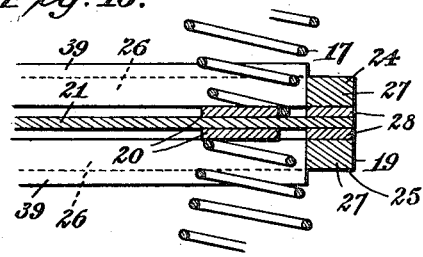
Fig. 13 is an enlarged longitudinal section taken on line $e$—$e$, Fig. 1; the intermediate portion of the spring only being shown.

As clearly shown in Fig. 11, the springs at the side of each section are retained against lateral displacement by the inner strip 21 of the pair of tie-strips shown at 30, the convolutions of the springs of each side row being held between such strips. This arrangement is particularly desirable at the sides of the bed-spring owing to the fact that these springs are subjected to greatest wear, due to the habit many people have of sitting upon the bed at the sides thereof when undressing, and at other times.

Where the longitudinal and transverse strips intersect at the points of fastening the spring 17 to the frame, the transverse strips are slipped into the springs, or more particularly between two convolutions of the spring, and the longitudinal strip is slipped between the two transverse strips between two of the convolutions of the spring, as shown in Fig. 10. It is not found necessary to lock the intermediate rows of springs in the same manner as provided for the side rows, as the intermediate springs are not subjected to the lateral strains imparted to the side rows by reason of sitting upon the edge of a bed; but, if desired, such intermediate springs may be locked against movement lengthwise on the transverse strips in the same manner as the longitudinal side rows of springs.

Figure 15:
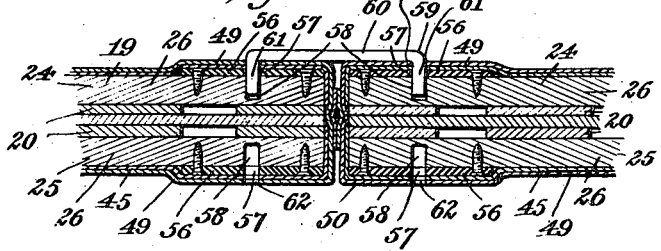
Fig. 15 is an enlarged longitudinal section taken on line $g$—$g$, Fig. 1.

At the upper and lower ends of the sides of the frame member 19 I secure metallic plates 56, each plate having an opening 57 therein and the two parts 24, 25 of the frame member 19 are provided with sockets 58 which register with said openings. When the sections of the bed spring are placed in position they are detachably locked together by means of a retainer 59 which comprises a longitudinal portion 60 and two downwardly bent portions 61 which are passed through the openings 57 in the plates 56 and into the sockets 58 of the frame member 19, thus preventing separation of the sections. When the bed-spring is covered, the ticking or other material is also provided with openings 62 in line with the openings 57 in the plates 56, as clearly shown in Fig. 15. In such case it is of course necessary that the depending or downwardly bent portions 61 and the retainers 57 be passed through the covering material.

It is generally known that an iron or other metallic bed which has only the side rails connecting the head and bottom members together, is oftentimes strained when moving the bed on the floor so that the head and bottom members are moved out of rightangular position with reference to the side rails, and to avoid this I have provided the retainer strips 39 which, whether covered or uncovered, lie in contact with the side rails, as shown in Figs. 3 and 5. Thus the rigidity of my improved bed-spring, which has its frame tied transversely and braced diagonally, is utilized in stiffening the bedstead and preventing the parts thereof being forced out of proper rectangular relation, one to the other.

Having thus described my invention, what I claim is,—

1. A bed-spring comprising a rectangular frame having two parts spaced apart, a plurality of pairs of spaced supporting strips having their ends secured between the parts of said frame, a plurality of single tie strips arranged at right angles to said pairs of supporting strips and inserted between the strips of each of said pairs of supporting strips with their ends fastened between the two parts of said rectangular frame, and double cone springs having their central coils or convolutions surrounding said strips so as to hold said springs thereto.

2. A bed-spring comprising an outer frame member having two rectangular parts spaced apart, a set of longitudinal strips and a set of transverse strips within said rectangular frame and having their ends secured between the two parts of said frame, diagonal brace strips connecting one set of said strips, and springs secured between their ends to one set of said strips.

3. A bed-spring comprising a rectangular frame member having two spaced parts, supporting strips arranged in pairs with the strips of each pair spaced apart and having their ends entered between the two parts of said rectangular frame, a filling strip between the two parts of said rectangular frame at opposite sides thereof and between the ends of the several pairs of supporting strips, said frame and strips being fastened together, and springs fastened midway between their ends to said supporting strips.

4. A bed-spring comprising a frame, parallel strips having their ends secured to opposite points of said frame and being arranged in pairs with the strips of each pair spaced apart, tie-strips arranged at right angles to said supporting strips and passed between the strips of each pair of supporting strips with their ends secured to the frame at opposite points, said tie-strips being arranged in pairs near opposite sides of the frame, and coil springs arranged in parallel rows and having the strips of each pair of supporting strips entered laterally between the central coils or convolutions of said springs, each side row of springs having one of its convolutions or coils entered between the strips of each pair of tie-strips at the sides of the frame to prevent movement of said springs lengthwise along said supporting strips.

5. A bed-spring comprising a frame and a plurality of springs secured midway between their ends to said frame and projecting from the top and bottom of the latter, the side rows of springs being spaced from the side edges of the frame to provide supporting ledges at opposite sides of the frame adapted to rest upon the rails of a bedstead, and slats also supported from said side rails upon which the lower projecting portions of said springs bear when the ledges of said frame rest upon said side rails.

6. In combination with a bedstead having side rails, a plurality of hangers provided with hook portions at their upper ends hooking onto said side rails and with inwardly-projecting securing portions at their lower ends, and slats secured to said inwardly-projecting portions, of a bed-spring having supporting ledges at opposite sides resting upon the hook portions of said hangers and having springs projecting upwardly and downwardly from said frame with the downwardly-projecting portions of said springs resting upon said slats.

7. A bed-spring comprising a rectangular main frame having parallel supporting strips arranged at intervals in said frame, springs projecting from said supporting strips, and a tie frame secured to the ends of the outermost of said springs, said tie frame comprising two pairs of slats arranged at opposite sides of said frame and having the end convolutions of the adjacent springs clamped therebetween, and wires connecting opposite ends of opposite pairs of slats and also having the end convolutions of adjacent springs secured thereto.

8. A bed-spring comprising a plurality of sections, each section comprising a main frame, springs projecting upwardly from said main frame and arranged in transverse rows, and a tie frame for each section comprising two pairs of slats, each pair having the uppermost convolution of the side springs attached thereto, and wires arranged transversely and connecting opposite ends of said two pairs of slats, said wires having the end rows of springs secured thereto and being adapted to be depressed with said springs under superimposed weight.

9. A bed-spring comprising a main frame and springs projecting upwardly and downwardly from said main frame so that the bed-spring may be reversed, the side marginal portions of said main frame being adapted to rest upon the side rails of a bedstead, and retainer members projecting upwardly above the upper surface of the main frame and downwardly below the lower surface thereof so that either the upwardly or downwardly projecting retainer members may be fitted between and in contact with the side rails of the bedstead, for the purpose described.

In testimony whereof I affix my signature.

JOHN W. HOLMLUND.